United States Patent [19]

Landesfeind

[11] Patent Number: 5,265,704
[45] Date of Patent: Nov. 30, 1993

[54] APPARATUS FOR DAMPING COURSES OF MOTION

[75] Inventor: Klaus Landesfeind, Fellbach, Fed. Rep. of Germany

[73] Assignee: Robert Bosch GmbH, Stuttgart, Fed. Rep. of Germany

[21] Appl. No.: 927,993

[22] Filed: Aug. 11, 1992

Related U.S. Application Data

[63] Continuation-in-part of Ser. No. 714,395, Jun. 12, 1991, abandoned.

[30] Foreign Application Priority Data

Aug. 7, 1990 [DE] Fed. Rep. of Germany ....... 4024966

[51] Int. Cl.⁵ .................................................. F16F 9/18
[52] U.S. Cl. ..................................... 188/378; 267/136; 267/218; 267/221
[58] Field of Search ............... 267/217, 218, 221, 222, 267/136; 280/707; 188/299, 378

[56] References Cited

U.S. PATENT DOCUMENTS

| | | | |
|---|---|---|---|
| 3,858,902 | 1/1975 | Howells et al. | 267/221 X |
| 4,616,810 | 10/1986 | Richardson et al. | 267/221 X |
| 4,744,444 | 5/1988 | Gillingham | 267/221 X |
| 4,887,699 | 12/1989 | Ivers et al. | 267/221 X |
| 5,024,302 | 6/1991 | Karnopp | 188/319 X |
| 5,034,890 | 7/1991 | Sugasawa et al. | 280/707 X |
| 5,097,419 | 3/1992 | Lizell | 280/707 X |

FOREIGN PATENT DOCUMENTS 92413 4/1991 Japan ................................ 267/218

*Primary Examiner*—Douglas C. Butler
*Attorney, Agent, or Firm*—Edwin E. Greigg; Ronald E. Greigg

[57] ABSTRACT

An apparatus for damping courses of motion between two bodies in which a dynamic wheel load ($C_r$) can be reduced by intervention in a damping element of a frequency-dependent increase in the passive spring rigidity of a spring element, in order to vary the dynamic wheel loads in the direction of a reduction. The apparatus is intended for use in on-road vehicles.

4 Claims, 3 Drawing Sheets

APPARATUS FOR DAMPING COURSES OF MOTION

RELATED PATENT APPLICATION

This application is a continuation-in-part of copending application Ser. No. 07/714,395 filed on Jun. 12, 1991 which has been abandoned.

BACKGROUND OF THE INVENTION

The invention is based on an apparatus for damping courses of motion as set forth hereinafter. Such an apparatus is known from U.S. Pat. No. 5,024,302.

In this known model, an intervention into the positive volumetric displacement of the damping cylinder is made by open-loop control, thus making this apparatus a so-called active or semi-active damping system. However, this kind of model does not work specifically in the natural frequency range of the wheel.

OBJECT AND SUMMARY OF THE INVENTION

The above apparatus has an advantage over the prior art that it varies the dynamic wheel loads of vehicles in the direction of a reduction in such a way as to improve driving safety, while at the same time any sacrifices in comfort are slight compared with known versions.

It also has an advantage of producing little noise.

The invention will be better understood and further objects and advantages thereof will become more apparent from the ensuing detailed description of a preferred embodiment taken in conjunction with the drawings.

DESCRIPTION OF THE PREFERRED EMBODIMENT

The apparatus serves to damp courses of motion of two bodies or masses moving relative to one another and at variable speeds in terms of their absolute positions. The bodies or masses are for example a vehicle body or a vehicle mass and a wheel support or an axle with a wheel secured to it, or a wheel mass, in which a damping element, with a piston displaceably supported in a damping cylinder, is supported between the vehicle mass and the wheel mass.

Figure 1:
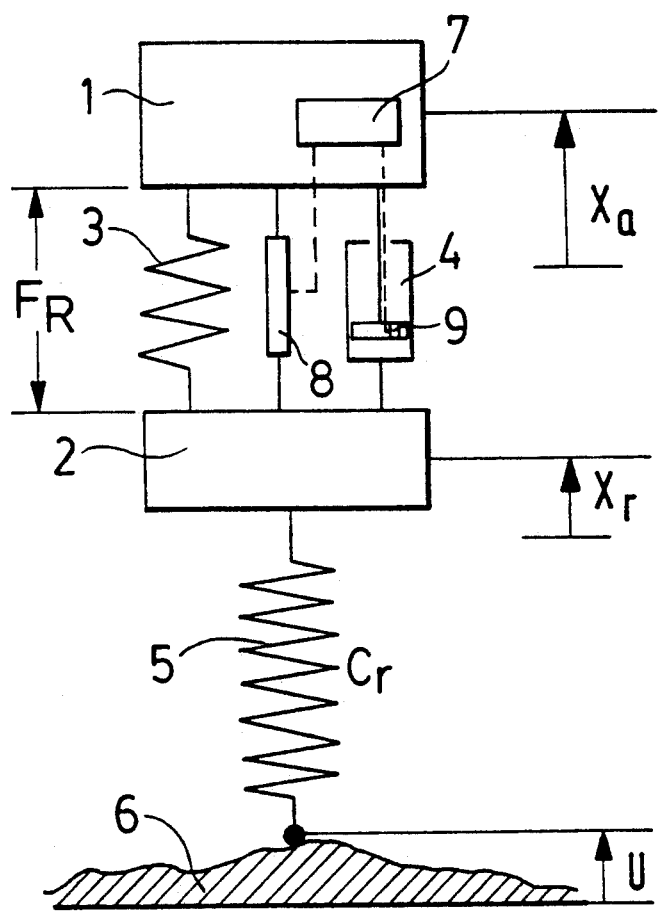
FIG. 1 is a diagram of a mockup of a suspension system.

FIG. 1 shows an active or semi-active vehicle suspension system that for the suspension of a vehicle body has a spring element 3 and a damping element 4 disposed parallel to it, both located between a vehicle mass 1 and a wheel mass 2. The wheel mass 2 is resiliently supported—as represented symbolically by a spring 5—on a road surface 6. The unevenness of the road surface 6 is indicated by the symbol U, the spring deflection of the wheel, i.e., the motion of the wheel mass 2, by the symbol $X_r$, and the vehicle body motion by the symbol $X_a$. The spring rate of the tire, symbolically represented by the spring 5, is shown by the symbol $C_r$.

A control element 7 is intended for (semiactively or actively) reducing the dynamic wheel load $P_{dyn}$ by intervention into the damping element 4, by means of frequency-dependently increasing an additional force $F_R$ in the damping element 4. Such a reduction is carried out by electrical means 9, for example, such as electromagnetic valves or electromagnetic controllers. The goal is for the dynamic wheel load $P_{dyn}=C_r(X_r-U)$ to be as low as possible. The dynamic wheel load $P_{dyn}$ is the deviation, during the trip, from the static wheel load $P_{stat}$, and the static wheel load $P_{stat}$ is the proportion of the vehicle weight supported over the applicable wheel.

The control element 7 receives a spring deflection signal from a spring deflection sensor 8. The sensor ascertains the spring deflection signal by measuring the relative distance between the vehicle mass and the wheel mass 2. The control element 7 controls the electrical means 9 of the damping element 4.

The control element 7 controls the electrical means 9 in such a Way that the additional force $F_R$ can act in an inventive way between the vehicle mass 1 and the wheel mass 2. In other words, in the present invention an indication is given of how the force $F_R$ must be varied in order to vary the dynamic wheel load $P_{dyn}$ in the desired way. This will be explained hereinafter.

The electrical means 9 include an electrically adjustable throttle, for instance, or an electrically adjustable pressure regulating valve.

The force $F_R$ can be varied, for instance, by using the electrical means 9 within the damping element 4 to control the flow cross section of the throttle or of the pressure limiting valve of the damping element 4. Upon a relative motion between the vehicle mass and the wheel mass 2, at least some of the pressure fluid flows through the electrical means 9.

Electrical connections are shown in dashed lines in FIG. 1.

A separate spring deflection sensor 8 may be provided for each wheel 2 of a vehicle, and for each wheel 2, the requisite force $F_R$ can be ascertained and adjusted separately. The control elements 7 for a plurality of wheels may be combined in a single unit. In each wheel 2, it is also possible, for instance, for the sensor 8, the control element 7 and the electrical means to be integrated with the damping element 4.

In known actively or semi-actively regulated apparatuses for damping courses of motion (as in U.S. Pat. No. 5,024,302), set-point forces are ascertained from the ascertained sensor signals in a controller, so that a particular desired effect can be attained. Depending on the control strategy, the set-point force can be composed of a plurality of individual set-point forces. The set-point force is the result of adding together of the individual set-point forces. The signals of various sensors can be taken into account. For instance, the sensors ascertain a spring deflection, a vehicle body acceleration, a wheel acceleration, a steering lock angle, pitching of the vehicle, and so forth. From the set-point force ascertained, with the aid of a performance graph fed to the controller, the electrical variable (voltage and/or current) to be supplied to the electrical means of an adjustable damper is calculated. The set-point force acts on the chassis between the vehicle body and the wheel suspension.

In the apparatus proposed here for damping courses of motion, at least the spring deflection sensor 8 is present, but it is also possible, in a known manner, for other sensors that detect different variables to be present as well. The other sensors are not shown in the drawing, for the sake of simplicity.

As in the known apparatuses, in the apparatus proposed here as well the set-point force may be composed of a plurality of individual set-point forces; however, in our invention, the spring deflection signal ascertained by the spring deflection sensor 8 is high-pass filtered. Its processing and transmission on to the electrical means 9 of the damping element 4, and optionally the procession and transmission of the other existing sensor signals as well, are done as in the known apparatuses; in particular, the other set-point forces can be added to the additional force $F_R$ calculated from the spring deflection signal obtained from the high-pass filtration.

The order of amplification and high-pass filtering of the spring deflection signal ascertained by the spring deflection sensor 8 is arbitrary.

Figure 2:
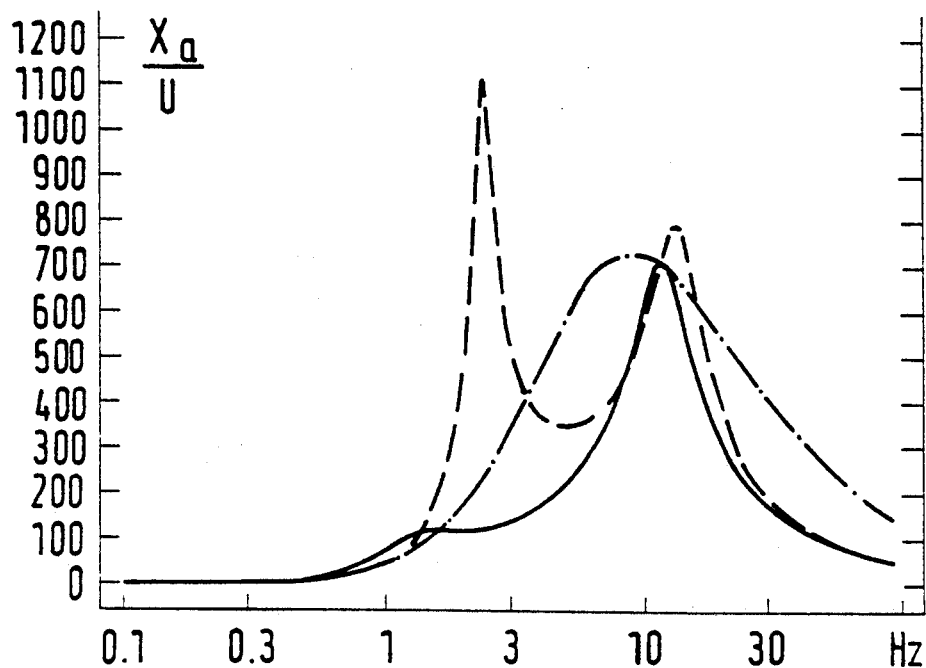
FIGS. 2, 3, 4 and 5 show various diagrams of various frequency responses in the vehicle model of FIG. 1.
Figure 3:
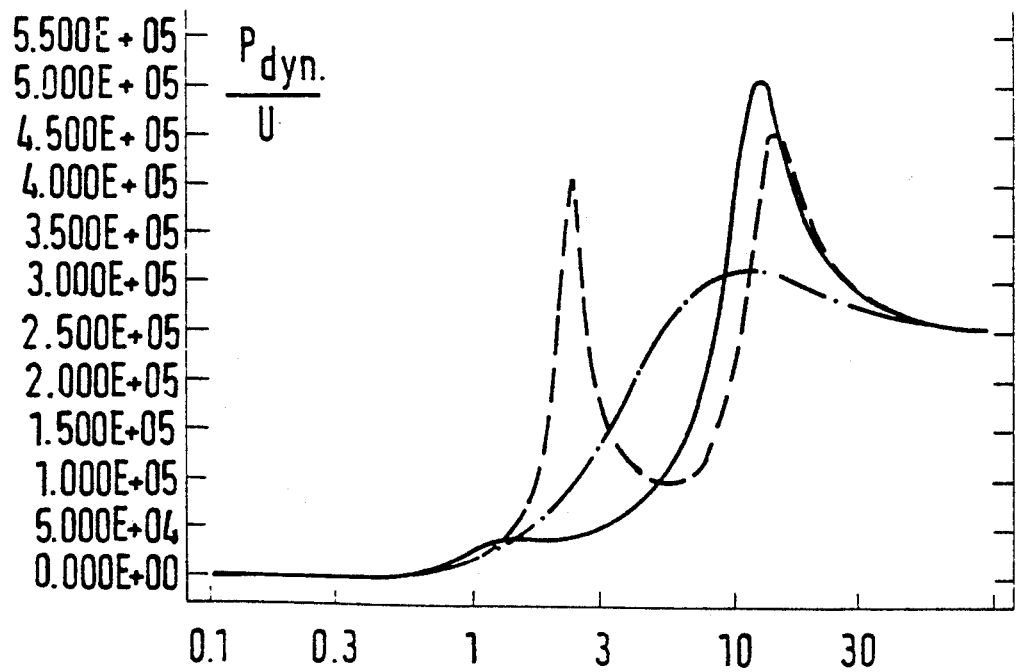

Two first diagrams are shown in FIGS. 2 and 3. In each, the frequency is plotted in Hz on the abscissas, and the amplitude of the frequency response $\ddot{X}_a/U$ (in FIG. 2) and the amplitude of the frequency $P_{dyn}/U$ for spring rigidity (in FIG. 3) are plotted on the ordinates. $\ddot{X}_a$ is the acceleration of the body in the vertical direction. The acceleration $\ddot{X}_a$ of the body is a measure of the comfort of the ride. The symbol $\ddot{X}_a/U$ is understood as the body acceleration $\ddot{X}_a$ as a function of the roadway roughness U, and $P_{dyn}/U$ is the dynamic wheel load $P_{dyn}$ as a function of the roadway roughness U. Both diagrams include one curve drawn in solid lines for a passive system with normal tuning (normal damping and normal spring rigidity), one curve in dot-dash lines for a passive system with high damping (but normal spring rigidity), and one curve in dashed lines for a passive system with high spring rigidity (but normal damping). The spring rigidity is associated with the spring element 3 shown symbolically in FIG. 1. It can be seen that in the relevant frequency curves in terms of comfort and dynamic wheel load, the dynamic wheel load $P_{dyn}$ can be reduced in the range of the natural wheel frequency, that is, between 10 and 15 Hz, without notably degrading comfort in this frequency range, by increasing the passive spring rigidity.

The following conclusions can be drawn from the diagrams of FIGS. 2 and 3:

| Frequency Range | High Damping | High Spring Rigidity | Standard |
|---|---|---|---|
| f < 1 Hz comfort | good | good | good |
| dynamic wheel load | good | good | good |
| 1 Hz < f < 5 Hz comfort | poor | miserable | satisfactory dynamic |
| wheel load | poor | miserable | satisfactory |
| 5 Hz < f < +10 Hz comfort | miserable | good | satisfactory dynamic |
| wheel load | poor | good | satisfactory |
| f > 10 Hz comfort (noise) | miserable | adequate | satisfactory |
| dynamic wheel load | very good | good | satisfactory |

The table shows that high spring rigidity in the range of the natural wheel frequency reduces the dynamic wheel load $P_{dyn}$, without substantially degrading comfort in this range (in contrast to increasing the passive damping).

In order to avoid the poor dynamic wheel load and poor comfort in the range from 1 to 5 Hz, it is proposed according to the invention to bring to bear an additional force $F_R$ that is proportional to the high-pass-filtered spring deflection travel. The spring deflection signal corresponding to the spring deflection is obtained in a known manner via the sensor 8. The high-pass filtration of the spring deflection signal is obtained by means of an electrical circuit with a high-pass filter. A circuit with a high-pass filter has long been known in radio technology. A high-pass filter is a circuit that transmits high frequencies unaltered and that at low frequencies affects an attenuation and phase advance.

This effect of the high-pass filter is exploited in our invention. In our apparatus for damping courses of motion, the spring deflection signal transmitted by the spring deflection sensor 8 to the control element 7 is passed on, high-pass filtered and processed appropriately, to the electrical means 9 of the damping element 4. In accordance with this signal, the throttle of the electrical means 9 in the damping element 4 is for instance suitably varied, so that the additional force $F_R$ is obtained in proportion with the high-pass filtered spring deflection signal between the vehicle mass 1 and the wheel mass 2.

With this selective, frequency-dependent variation of the additional force $F_R$, the vehicle handling and comfort of the rise can be improved over a very high frequency range, without involving the disadvantages that increasing the passive damping of the damping element 4, for instance, or increasing the spring rigidity of the spring element 3 in certain frequency ranges would have, as is shown in the table in this application.

Figure 4:
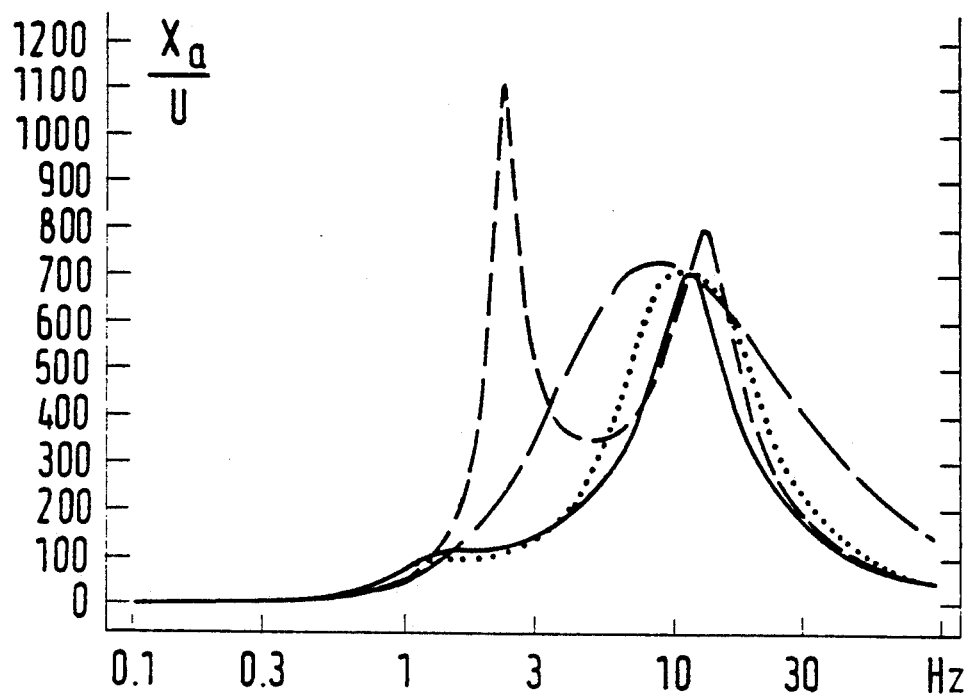
Figure 5:
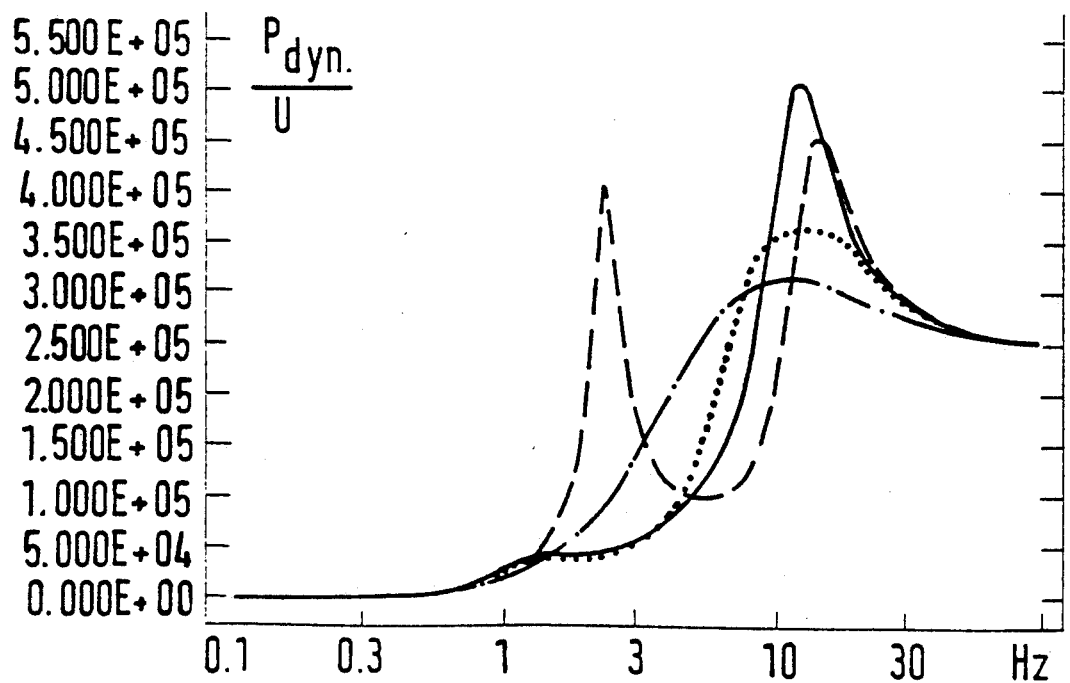

FIGS. 4 and 5 show how bringing such a force $F_R$ and the dynamic wheel load $P_{dyn}$ to bear affects comfort and dynamic wheel load.

FIG. 4 corresponds to FIG. 2, and FIG. 5 corresponds to FIG. 3; in FIGS. 4 and 5, in each case with a dotted line, the respective frequency response for a chassis with an apparatus for damping courses of motion, as explained in the present invention, is also shown.

The curve course for a thus-regulated system with the additional force $F_R$ is represented in FIGS. 4 and 5 by a dotted line. FIG. 4 shows that comfort in the range of the natural wheel frequency from 10 to 15 Hz is degraded only insignificantly, although care must be taken to provide far better isolation of the body from the unevenness of the road surface than in the case of a system with high passive damping.

As the tables of this specification and FIGS. 2 and 3 show, a constantly high spring rigidity over the entire frequency range is unfavorable. The apparatus embodied in accordance with this invention for damping courses of motion results in a chassis with handling safety and a comfortable suspension, with the effect of frequency-dependent spring rigidity. However, since true frequency-dependent variation of the spring rigidity is not possible with technically feasible means, the additional force $F_R$ that is generated in proportion with the high-pass filtered spring deflection signal is brought to bear instead, which has the same effect as a corresponding frequency-dependent variation in the spring rigidity.

FIG. 5 clearly shows that according to the invention the dynamic wheel load in the range of the natural wheel frequency of 10 to 15 Hz can be reduced by approximately 25%, without notable impairment in other frequency ranges compared with a conventional system.

The foregoing relates to a preferred exemplary embodiment of the invention, it being understood that other variants and embodiments thereof are possible within the spirit and scope of the invention, the latter being defined by the appended claim.

What is claimed and desired to be secured by Letters Patent of the United States is:

1. An apparatus for damping courses of motion of two bodies or masses moving relative to one another and at variable speeds in terms of their absolute positions for damping resilient wheel suspensions in vehicles, a damping element including a piston displaceable in a damping cylinder and dividing said damping cylinder into two work chambers, wherein the damping cylinder and piston of said damping element are each jointly connected to one of the bodies or masses by a spring element connected parallel to the damping element, wherein with the aid of the damping cylinder, a variable additional force ($F_R$) acting upon the bodies or masses is generated by an electrical means, in which the generated force ($F_R$) is in proportion to a high-pass filtered spring deflection travel signal produced by a high pass filter.

2. An apparatus for damping courses of motion of two bodies or masses moving relative to one another and at variable speeds in terms of their absolute portions for damping resilient wheel suspension in vehicles, having a sensor for measuring a relative distance between said two bodies or masses which provides a signal representative thereof, a high-pass filter for filtering said signal which provides a high-pass-filtered signal, a damping element, a spring element connected parallel with said damping element, said damping element comprising a damping cylinder which is divided into two work chambers by a piston displaceable in the damping cylinder wherein the damping cylinder and piston of said damping element are each jointly connected to one of the bodies or masses by said spring element connected parallel to the damping element, and electrical means for generating a variable additional force ($F_R$) acting upon the bodies or masses, wherein said force ($F_R$) is generated proportional to said high-pass-filtered signal.

3. An apparatus as defined by claim 2, in which said variable additional force ($F_R$) is placed between the two bodies in order to reduce a dynamic wheel load in proportion to a spring deflection travel.

4. An apparatus as defined by claim 3, in which the spring deflection travel is brought about by said high-pass filtered signal.

* * * * *